June 11, 1940. J. T. CRANDALL 2,204,475
SPINDLE FOR WINDING MACHINES
Filed May 28, 1938
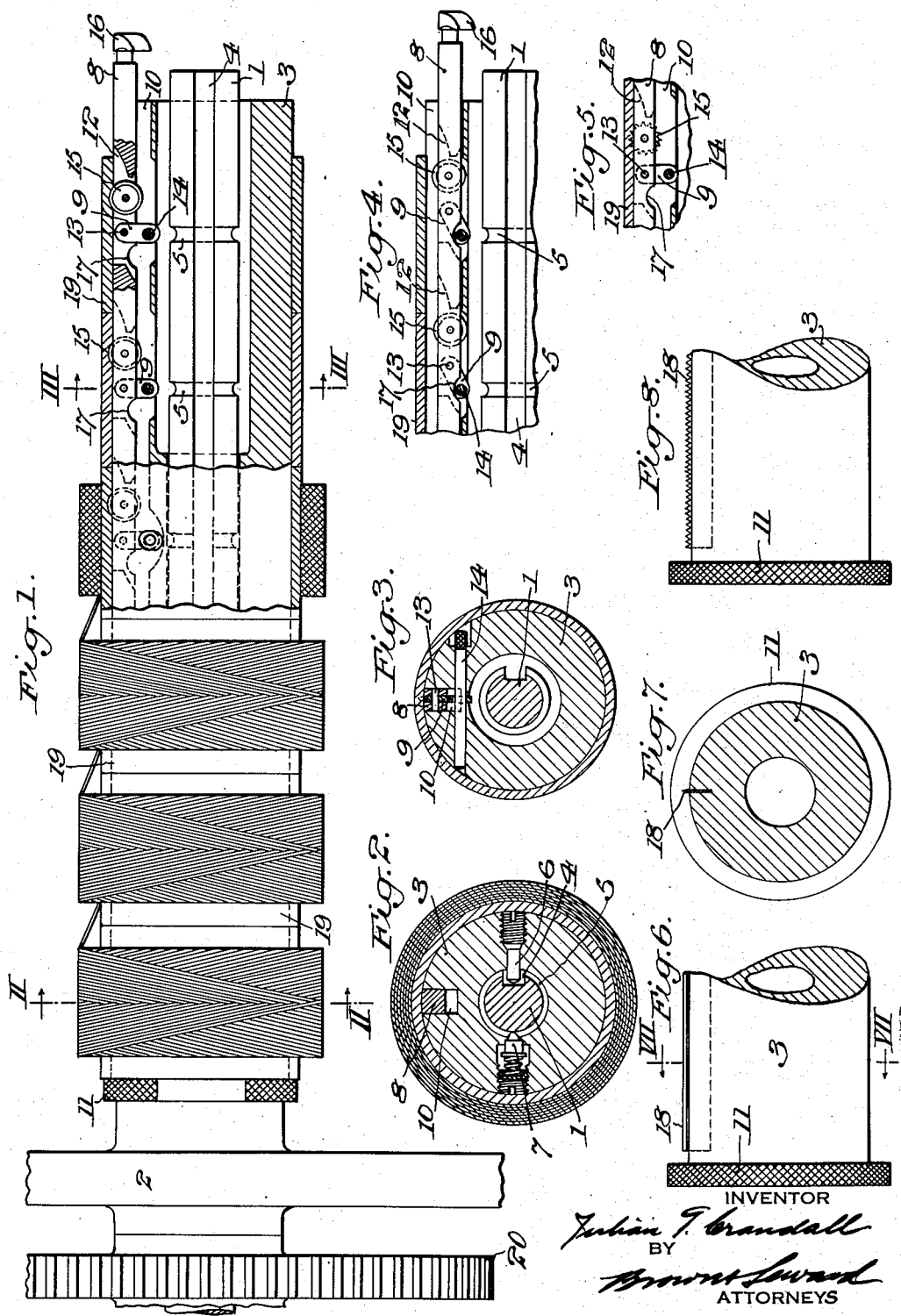
INVENTOR
Julian T. Crandall
BY
Brown Seward
ATTORNEYS Patented June 11, 1940

2,204,475

UNITED STATES PATENT OFFICE 2,204,475

SPINDLE FOR WINDING MACHINES

Julian T. Crandall, Ashaway, R. I., assignor to Ashaway Line & Twine Manufacturing Company, Ashaway, R. I., a corporation of Rhode Island Application May 28, 1938, Serial No. 210,586

5 Claims. (Cl. 242—18)

The object of my invention is to provide a rotary spindle for winding machines which will greatly facilitate the progressive winding of packages of fish line, twine, thread, ribbon, or the like, on adjacent core sections held on a sleeve carried by said spindle.

Another object of my invention is to provide a rotary spindle carrying a longitudinally adjustable sleeve adapted to be releasably held in different predetermined spaced positions along said spindle for the winding of successive packages on a core carried by said sleeve.

A further object of my invention is to provide a rotary spindle carrying a longitudinally adjustable sleeve releasably held thereon, said sleeve being provided with means for releasably securing a core thereto in order that it may be quickly and easily removed after successive packages have been wound thereon.

My invention comprises, generally, a rotary spindle, a sleeve slidable lengthwise only thereon, and means for yieldingly holding the sleeve in different positions along the spindle, said sleeve being provided with means for releasably securing a core thereto to permit easy removal thereof, when desired.

Practical embodiments of my invention are shown in the accompanying drawing, in which Fig. 1 represents a front elevation partly in section of one embodiment of my invention showing the parts in position for winding;

Fig. 2 represents a section taken on the line II—II of Fig. 1, looking in the direction of the arrows, showing the sleeve holding means;

Fig. 3 represents a section taken on the line III—III of Fig. 1 looking in the direction of the arrows and showing the core holding means in engaged position;

Fig. 4 represents a detail view partly broken away to show the core holding means in disengaged position;

Fig. 5 represents a detail view of a modification of the core holding means shown in Figs. 3 and 4;

Fig. 6 represents a modified form of my invention;

Fig. 7 represents a section taken on the line VII—VII of Fig. 6, and

Fig. 8 represents a modified form of the embodiment shown in Fig. 6.

A spindle 1 is rotatably supported at one end in side frame 2 of a winding machine, said spindle 1 being adapted to carry the sleeve 3 thereon and having a longitudinal groove or channel 4 extending from the outer end inwardly, approximately the length of the sleeve 3. The spindle 1 is also provided with recesses shown in the present instance as circumferential grooves 5 spaced along the periphery at predetermined intervals.

Sleeve 3 is bored to receive and be supported by spindle 1, approximately the outer half of said bore being enlarged to lighten the sleeve at the outer end. Said sleeve is adjustably mounted on spindle 1 and is held against rotation thereon by means of a tongue 6 adapted to slide in the longitudinal groove or channel 4 in the spindle. Means for holding sleeve 3 in predetermined positions along spindle 1 comprises a spring pressed dog 7 carried thereby and adapted to engage the spaced circumferential grooves 5 as the sleeve is slid longitudinally along the spindle.

Sleeve 3 carries core holding means comprising a hand bar 8 movably mounted on swingable levers 9 in a longitudinal groove or channel 10 cut in the outer surface of the sleeve and extending from the outer end thereof to the inner surface of shoulder 11 formed integral with the opposite end of sleeve 3.

This hand bar 8 is provided with longitudinal vertical slots 12 adapted to receive the upper ends of levers 9 which are pivoted therein on pins 13, the lower ends of said levers 9 being swingably mounted in the groove 10 on pins 14. Also mounted in each slot 12 is a core engaging device shown, in the present instance, as a disc 15 which may be provided with either a solid or serrated cutting edge. Bar 8 is provided with a suitable handle 16 and also has its under surface cut away at predetermined intervals 17 to furnish clearance for pins 14 when said bar is in a lowered position.

In Fig. 6 the core engaging device is shown as a knife blade 18 which is mounted along practically the entire length of sleeve 3 and positioned to engage the inner surface of a core 19, it being understood that this blade may have either a solid or serrated cutting edge.

It will also be understood that the spindle 1 may be driven by any well known or approved means (not shown herein) through the gear 20 fixed thereon.

In operation, presupposing a plurality of core sections are to be wound: The cores 19 are slid on over sleeve 3 on which shoulder 11 acts as a stop. When the desired number of core sections have been put on sleeve 3 the handle 16 is pushed, and the bar 8 carrying core engaging devices 15 is moved inwardly and radially outwardly by the throw of the swingable levers 9 until the edges of the core engaging devices 15 impinge on the inner surfaces of the core sections, thereby securing the core to the sleeve in a position for winding packages thereon. Then the sleeve 3 carrying core 19 is slid on over spindle 1, tongue 6 of sleeve 3 sliding in the longitudinal groove or channel 4 of spindle 1, until, at a desired point, the end of spring pressed dog 7 engages one of the circumferential grooves 5 of spindle 1. The spindle carrying the sleeve and core or cores is then driven by any well known or approved means (not shown herein) through the gear 20 fixed thereon to wind a package. When this package has been completed, sleeve 3 is moved longitudinally until the tip of spring pressed dog 7 engages the next succeeding circumferential groove 5 and is thus positioned for winding another package. The above operation is repeated until the desired number of packages has been wound. To permit removal of the completed package unit, handle 16 is pulled, moving the bar 8 outward and radially down, thereby disengaging discs 15 from the inner surface of the core 19 when endwise removal of the unit may be easily accomplished.

When the form shown in Figs. 6, 7 and 8 is used, the core is pushed on over sleeve 3 and knife blade 18 mounted therein. Said blade engages the inner core surface and holds same in position for winding a package thereon. Sleeve 3 may be positioned longitudinally, as above described. Removal of the package unit is accomplished by pulling same endwise from the sleeve.

It will be understod that in the use of either embodiment of my invention the sleeve 3 may be supplied with a core or cores either before or after having been placed on spindle 1.

It will also be understood that winding may be commenced at any predetermined point of the core, held by sleeve 3, since the longitudinal adjustment of the sleeve may be accomplished merely by pulling or pushing same until the spring pressed dog 7 snaps into a circumferential groove 5.

It is evident that various changes may be resorted to in the construction, form and arrangement of the several parts without departing from the spirit and scope of my invention, and hence I do not intend to be limited to the particular embodiments herein shown and described, but what I claim is:

1. In a package winder, a rotary spindle having circumferential grooves, a sleeve slidable lengthwise only and adjustable along said spindle, means for holding the sleeve on the spindle including a spring pressed dog positioned to coact with said circumferential grooves, a core slidable on the sleeve, and means for releasably holding the core on the sleeve, comprising swingable members provided at their outer ends with core penetrating elements and a hand bar for bringing said elements into and out of operative positions.

2. In a package winder, a rotary spindle having circumferential grooves, a sleeve slidable along said spindle, means for holding the sleeve on the spindle carried by said sleeve and adapted to coact with said grooves, a core slidable on the sleeve, and means for releasably holding the core on the sleeve, said means being mounted wholly on the sleeve and including swingable members provided at their outer ends with core penetrating elements and a hand bar for bringing said elements into and out of operative positions.

3. In a package winder, a rotary spindle supported at one end only and having circumferential grooves, a sleeve substantially the length of the spindle and slidable lengthwise only over the free end thereof, said sleeve carrying means adapted to coact with said circumferential grooves for holding said sleeve in predetermined positions on the spindle, a core slidable on the sleeve, and means for holding the core on the sleeve.

4. In a package winder, a rotary spindle supported at one end only and having circumferential grooves, a sleeve substantially the length of the spindle and slidable lengthwise only over the free end thereof, a core slidable on the sleeve, means for holding the core on the sleeve, other means for holding the sleeve from turning on the spindle, and means for holding the sleeve in different spaced positions along the spindle, said last named means comprising a spring pressed dog positioned to coact with the grooves on the spindle.

5. In a package winder, a rotary spindle supported at one end only and having circumferential grooves, a sleeve substantially the length of the spindle and slidable lengthwise only over the free end thereof, said sleeve carrying means adapted to coact with said circumferential grooves for holding said sleeve in predetermined positions on the spindle, a core slidable on the sleeve, and means carried by said sleeve for holding the core thereon comprising a blade fixed in the periphery of the sleeve substantially throughout its length.

JULIAN T. CRANDALL.